(12) United States Patent
Alexander

(10) Patent No.: US 10,812,476 B2
(45) Date of Patent: Oct. 20, 2020

(54) AUTHORIZATION OF ANOTHER DEVICE FOR PARTICIPATION IN MULTI-FACTOR AUTHENTICATION

(71) Applicant: salesforce.com, inc., San Francisco, CA (US)

(72) Inventor: Joshua David Alexander, Austin, TX (US)

(73) Assignee: salesforce.com, inc., San Francisco, CA (US)

( * ) Notice: Subject to any disclaimer, the term of this patent is extended or adjusted under 35 U.S.C. 154(b) by 241 days.

(21) Appl. No.: 15/985,913

(22) Filed: May 22, 2018

(65) Prior Publication Data

US 2019/0364034 A1 Nov. 28, 2019

(51) Int. Cl.
*H04L 29/06* (2006.01)
*H04L 9/08* (2006.01)
*H04L 9/32* (2006.01)

(52) U.S. Cl.
CPC ........ *H04L 63/0853* (2013.01); *H04L 9/0819* (2013.01); *H04L 9/0861* (2013.01);
(Continued)

(58) Field of Classification Search
CPC ... H04L 63/0853; H04L 63/12; H04L 9/0919; H04L 9/0861; H04L 9/3228; H04L 2463/082

See application file for complete search history.

(56) References Cited

U.S. PATENT DOCUMENTS 5,963,646 A 10/1999 Fielder et al.
5,995,624 A 11/1999 Fielder et al.
(Continued)

FOREIGN PATENT DOCUMENTS

DE 3246839 B1 * 8/2016 ............. G06F 21/33
EP 2992663 B1 * 4/2014 ............ H04W 12/04

OTHER PUBLICATIONS

Google 2-step Verification, Article published Dec. 20, 2013 as verified by Internet Archive (4 pages); http://web.archive.org/web/20131220004531/http://www.google.com/landing/2step/#tab=why-you-need-it/ [Retrieved Apr. 23, 2018].

*Primary Examiner* — Paul E Callahan
(74) *Attorney, Agent, or Firm* — Kowert, Hood, Munyon, Rankin & Goetzel, P.C.

(57) ABSTRACT

Techniques are disclosed relating to authenticating a second mobile device for participation in a multi-factor authentication process. In disclosed embodiments, a server generates an authentication decision, based on communicating with a first mobile device as a factor in the multi-factor authentication process. After receiving a request from the first mobile device to authorize participation of a second mobile device in the multi-factor authentication process, the server may generate a secret and transmit the secret to the first mobile device. The server may receive information from the second mobile device, based on the second mobile device capturing an image of a display by the first mobile device, where the display is based on the transmitted secret. In some embodiments, the server then verifies the content of the information using the secret and verifies that the information is received within a determined time interval from transmitting the secret. After verifying the content and the time interval, the server may authorize participation of and communicates with the second mobile device as a factor in the multi-factor authentication process.

20 Claims, 7 Drawing Sheets

(52) U.S. Cl.
CPC ............ *H04L 9/3228* (2013.01); *H04L 63/12* (2013.01); *H04L 2463/082* (2013.01)

(56) References Cited

U.S. PATENT DOCUMENTS

| | | | |
|---|---|---|---|
| 6,049,612 | A | 4/2000 | Fielder et al. |
| 6,105,133 | A | 8/2000 | Fielder et al. |
| 7,104,444 | B2 | 9/2006 | Suzuki |
| 7,548,886 | B2 | 6/2009 | Kirkland et al. |
| 7,669,760 | B1 | 3/2010 | Zettner |
| 7,801,304 | B1 | 9/2010 | Harvey et al. |
| 7,805,749 | B1 | 9/2010 | Harvey et al. |
| 7,860,131 | B1 | 12/2010 | Harvey et al. |
| 7,908,638 | B1 | 3/2011 | Harvey et al. |
| 8,627,438 | B1 | 1/2014 | Bhimanaik |
| 8,806,567 | B1 | 8/2014 | Venable, Sr. |
| 8,861,724 | B2 * | 10/2014 | Weis ................ G06F 21/34 380/44 |
| 8,955,063 | B2 | 2/2015 | Shibuya |
| 2003/0182194 | A1 | 9/2003 | Choey et al. |
| 2006/0136334 | A1 | 6/2006 | Atkinson et al. |
| 2006/0282500 | A1 | 12/2006 | Kiuchi et al. |
| 2007/0055878 | A1 | 3/2007 | Sandhu et al. |
| 2007/0174082 | A1 | 7/2007 | Singh |
| 2010/0006642 | A1 | 1/2010 | Boutcher et al. |
| 2010/0100454 | A1 | 4/2010 | Sines et al. |
| 2010/0174649 | A1 | 7/2010 | Bouchard |
| 2010/0186074 | A1 * | 7/2010 | Stavrou ................ G06F 21/36 726/7 |
| 2010/0217880 | A1 | 8/2010 | Venezia et al. |
| 2010/0293598 | A1 | 11/2010 | Collart et al. |
| 2010/0299529 | A1 | 11/2010 | Fielder |
| 2011/0007901 | A1 | 1/2011 | Ikeda et al. |
| 2011/0047597 | A1 | 2/2011 | Mahaffey et al. |
| 2011/0142234 | A1 | 6/2011 | Rogers |
| 2011/0202466 | A1 | 8/2011 | Carter |
| 2011/0219230 | A1 | 9/2011 | Oberheide et al. |
| 2011/0307699 | A1 | 12/2011 | Fielder |
| 2011/0307705 | A1 | 12/2011 | Fielder |
| 2011/0307706 | A1 | 12/2011 | Fielder |
| 2011/0307707 | A1 | 12/2011 | Fielder |
| 2011/0312278 | A1 | 12/2011 | Matsushita et al. |
| 2011/0314281 | A1 | 12/2011 | Fielder |
| 2012/0066745 | A1 | 3/2012 | Wuthnow et al. |
| 2012/0068812 | A1 | 3/2012 | Yamamoto et al. |
| 2012/0096277 | A1 | 4/2012 | Perez Soria |
| 2012/0110329 | A1 | 5/2012 | Brown et al. |
| 2012/0144468 | A1 | 6/2012 | Pratt et al. |
| 2012/0158821 | A1 | 6/2012 | Barros |
| 2012/0159591 | A1 | 6/2012 | Payne et al. |
| 2012/0280784 | A1 | 11/2012 | Gaviria Velez et al. |
| 2013/0191884 | A1 | 7/2013 | Leicher et al. |
| 2014/0189808 | A1 | 7/2014 | Mahaffey et al. |
| 2014/0317713 | A1 * | 10/2014 | Gadotti ............ H04L 63/0853 726/7 |
| 2014/0378063 | A1 | 12/2014 | Nathwani et al. |

\* cited by examiner

```
┌─────────────────────────────────────────────────────────────────────┐
│ Generate an authentication decision for a multi-factor authentication process for a first │
│ account, wherein generating the authentication decision includes communicating with │
│         a first mobile device as a factor in the multi-factor authentication process      │
│                                        410                                                │
└─────────────────────────────────────────────────────────────────────┘
                                         │
                                         ▼
┌─────────────────────────────────────────────────────────────────────┐
│ In response to a request to authorize participation of a second mobile device as a │
│ factor in the multi-factor authentication process for the first account, generate a secret │
│                  and transmit the secret to the first mobile device                │
│                                        420                                         │
└─────────────────────────────────────────────────────────────────────┘
                                         │
                                         ▼
┌─────────────────────────────────────────────────────────────────────┐
│ Receive information from the second mobile device, wherein the information is │
│ generated based on capturing an image of a display by the first mobile device and │
│             wherein the display is based on the transmitted secret             │
│                                        430                                     │
└─────────────────────────────────────────────────────────────────────┘
                                         │
                                         ▼
┌─────────────────────────────────────────────────────────────────────┐
│                Verify content of the information using the secret                │
│                                        440                                       │
└─────────────────────────────────────────────────────────────────────┘
                                         │
                                         ▼
┌─────────────────────────────────────────────────────────────────────┐
│ Verify that the information is received within a determined time interval from the │
│                  transmitted secret to the first mobile device                  │
│                                        450                                      │
└─────────────────────────────────────────────────────────────────────┘
                                         │
                                         ▼
┌─────────────────────────────────────────────────────────────────────┐
│ Based on the verification of the content and the time interval, authorize participation of │
│  the second mobile device as a factor in the multi-factor authentication process for the │
│                                   first account                                   │
│                                        460                                        │
└─────────────────────────────────────────────────────────────────────┘
                                         │
                                         ▼
┌─────────────────────────────────────────────────────────────────────┐
│ Based on the authorization, communicate with the second mobile device as a factor in │
│        a subsequent multi-factor authentication process for the first account        │
│                                        470                                           │
└─────────────────────────────────────────────────────────────────────┘
```

Fig. 4

AUTHORIZATION OF ANOTHER DEVICE FOR PARTICIPATION IN MULTI-FACTOR AUTHENTICATION

BACKGROUND

Technical Field

Embodiments described herein relate to multi-factor authentication systems, and more particularly, to authorizing the participation of a mobile device as a factor in a multi-factor authentication process.

Description of the Related Art

User security in accessing private accounts is an ongoing problem for individuals attempting to access their accounts on the internet. Traditionally, a user attempting to access an account enters account credentials consisting of a username and password. However, this information may be easily obtained by another without permission from the user of the account.

One technique used to improve authentication systems is multi-factor authentication. As one example, after a user enters account credentials in an attempt to access a particular account, the authentication server may then send an out-of-band communication as a second factor, e.g., to another device associated with the account. For example, the authentication server may send a passcode to a device registered to the user, which the user may enter on the same device used to enter the account credentials. In another example, the user may respond directly via the registered device. Access to the particular server may be granted only if the correct account credentials are entered and the second factor via the registered device is successfully verified.

BRIEF DESCRIPTION OF THE DRAWINGS

FIG. 4 is a flow diagram illustrating an exemplary server-side method for authorizing a mobile device to participate in a multi-factor authentication process, according to some embodiments.

DETAILED DESCRIPTION

Multi-factor authentication schemes are often used by online service providers in an attempt to identify account owners and other users of their online services accurately. One form of multi-factor authentication involves contacting a secondary computing device (e.g., a mobile device) that the user registers with the account upon a new account creation. For example, a user may enter typical account credentials (e.g., a user identification and password) into an account sign-in user interface (UI) and if the credentials are valid, the server sends a code (e.g., via a short message service) to the registered mobile device (e.g., a mobile phone, tablet computer, wearable device, or other similar device). In this example, the user reads the code from the mobile device and enters it into the UI of the online service.

In some embodiments, it may be desirable to add another mobile device to replace a previous device or to serve as an additional factor in the multi-factor authentication process. As discussed in further detail below, in some embodiments, an existing registered device is used to facilitate authorization of another mobile device for participation in a multi-factor authentication scheme. For example, the existing registered device may be used to show proximity between the existing device and the new device.

Various embodiments of an authentication server are presented herein. In the disclosed embodiments, an authentication server may be used to facilitate replacement of an older mobile device with a new mobile device or the addition of another mobile device in a multi-factor authentication process. In some examples, the user of the old mobile device may use disclosed techniques to replace the old mobile device with the new mobile device. In other examples, the user of the old mobile device may use disclosed techniques to add the new device for participation in a multi-factor authentication process along with an existing device. In various embodiments, the disclosed techniques may advantageously provide improvements in security when adding or replacing a device as a factor in multi-factor authentication schemes. In particular, the disclosed techniques may reduce or eliminate fraudulent addition of devices by showing proximity or ownership relative to an already-authorized device.

Figure 1:
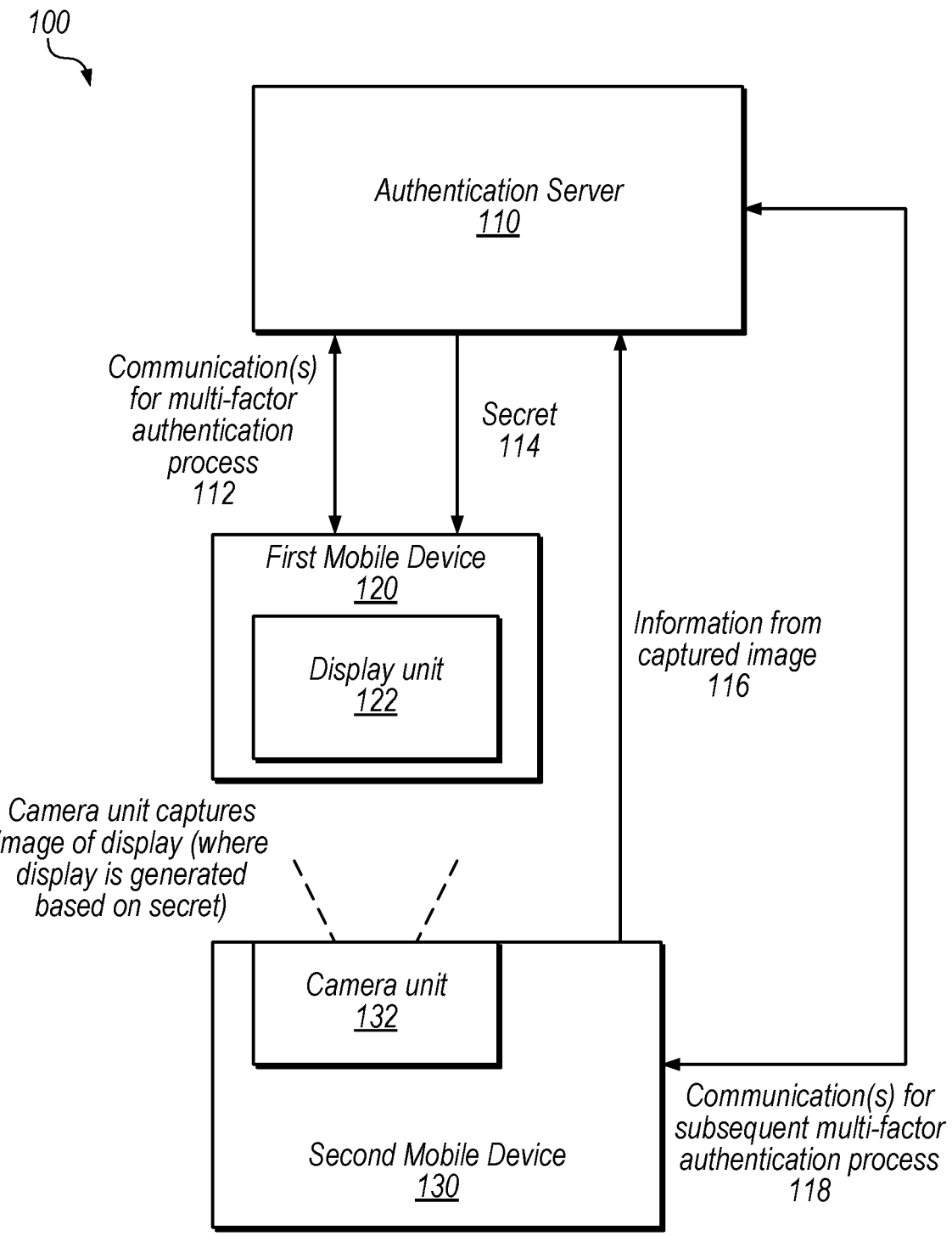
FIG. 1 illustrates a block diagram of exemplary authorization of a mobile device for use as a factor in a multi-factor authentication process, according to some embodiments.
Figure 5:
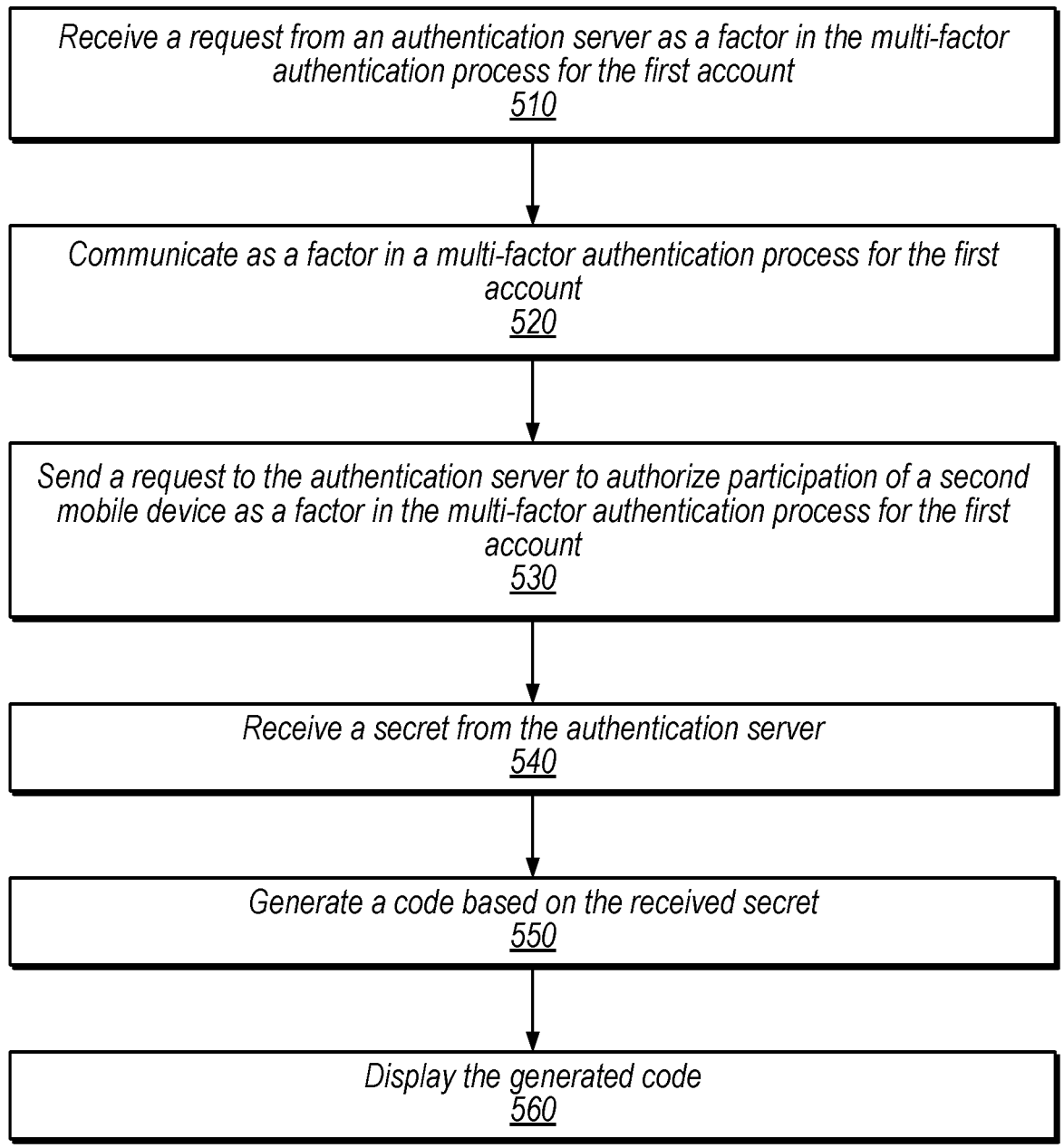
FIG. 5 is a flow diagram illustrating an exemplary mobile-side method for facilitating authorization of another device, according to some embodiments.
Figure 6:
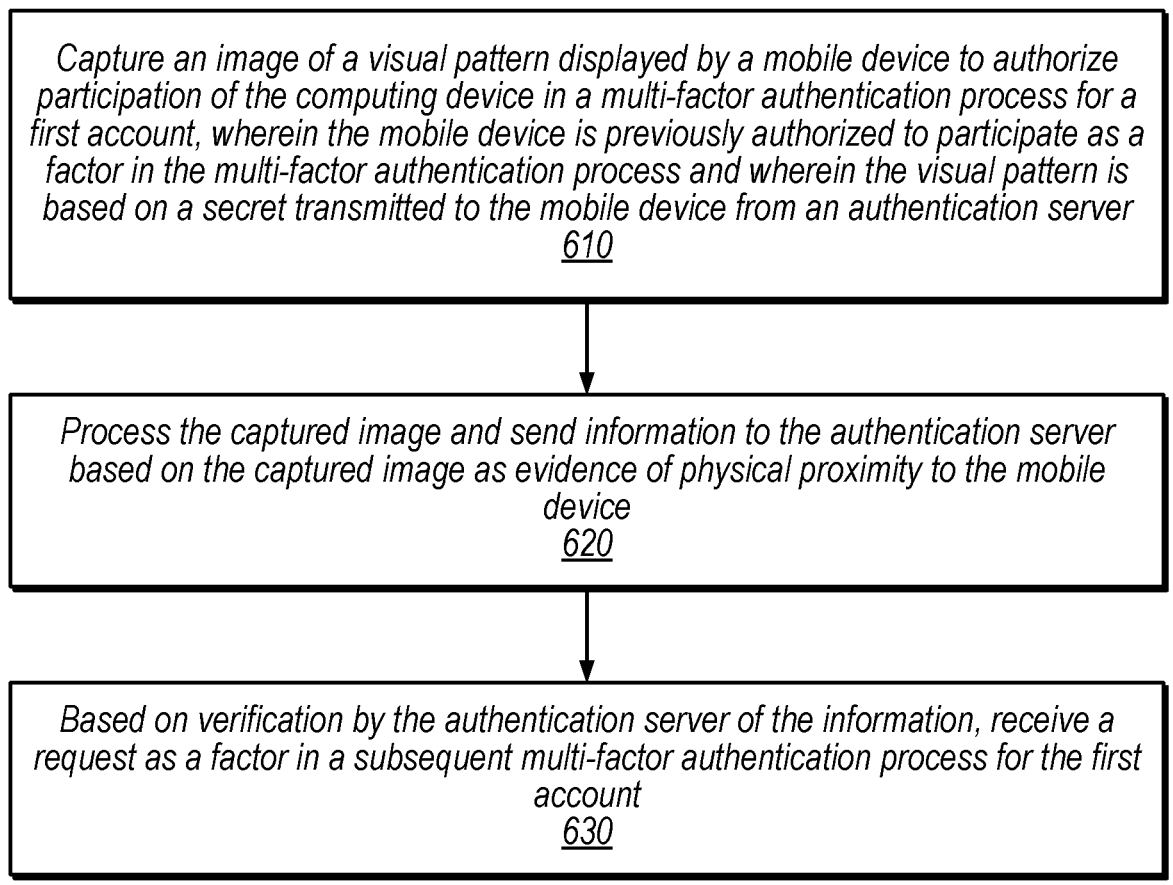
FIG. 6 is a flow diagram illustrating an exemplary mobile-side method for authorizing a mobile device, according to some embodiments.
Figure 7:
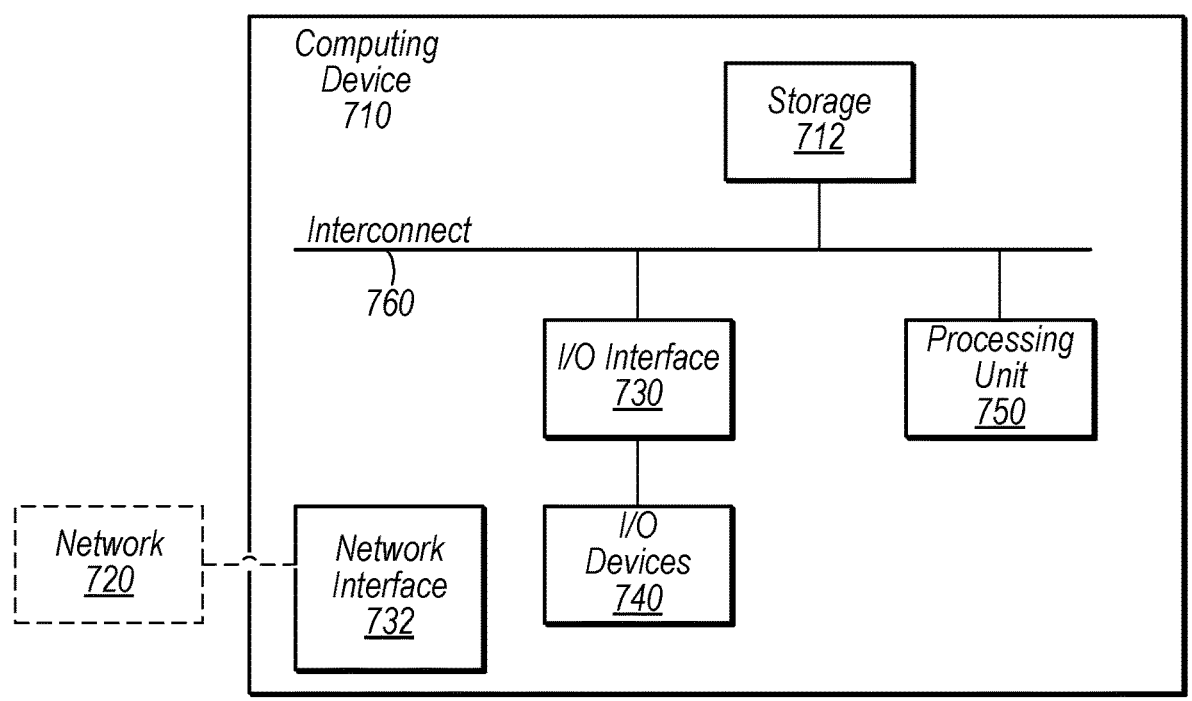
FIG. 7 is a block diagram illustrating an exemplary computing device, according to some embodiments.

This disclosure initially describes, with reference to FIG. 1, authorization of a mobile device for a multi-factor authentication process. Communication between an authentication server and two mobile devices is discussed with reference to FIG. 2. FIGS. 3A-3D facilitate the discussion of various UIs. FIGS. 4-6 illustrate exemplary methods and FIG. 7 shows an exemplary computing device.

Example Authentication Server

FIG. 1 is a block diagram illustrating an exemplary system 100 in which a device may be authorized to participate in a multi-factor authentication process, according to some embodiments. In the illustrated embodiment, system 100 includes authentication system 100, a first mobile device 120, and a second mobile device 130.

In the illustrated embodiment, first mobile device 120 and authentication server 110 exchange one or more communications for a multi-factor authentication process, as shown at 112. For example, authentication server 110 may send a passcode to first mobile device 120 or request and receive a permission response from first mobile device 120.

In some embodiments, server 110 receives a request (not explicitly shown) from first mobile device 120 to authorize a second mobile device as a factor in the multi-factor authentication process. In the illustrated embodiment, server 110 sends a secret 114 to device 120 based on such a request. The secret may be pseudo-randomly and/or cryptographically generated. In some embodiments, the secret may be pre-established with device 120, e.g., using public/private key cryptography or some other technique.

In the illustrated embodiment, the first mobile device 120 includes a display unit 122. In some embodiments, unit 122 displays an image that is generated based on the secret transmitted by the authentication server 110. For example, the image may display the secret or represent a value that is encoded based on the secret (e.g., as a QR code).

In the illustrated embodiment, the second mobile device 130 includes camera unit 132. In some embodiments, camera unit 132 is configured to capture images based on commands from device 130. In the illustrated embodiment, second mobile device 130 uses camera unit 132 to capture an image of the display unit 122. In some embodiments, this may show proximity of devices 120 and 130.

In the illustrated embodiment, device 130 transmits information 116 determined from the captured image to authentication server 110. The information may specify the secret or may be derived from the secret (e.g., in such a manner that authentication server 110 can verify that the secret was used to generate information 116).

In some embodiments, authentication server 110 authorizes device 130 for participation as a factor in a multi-factor authentication process based on the received information 116. In the illustrated embodiment, for this subsequent multi-factor authentication process, server 110 exchanges communication(s) 118 with second mobile device 130. In some embodiments, communication for subsequent processes includes authentication server 110 sending a permission request to the second mobile device as a factor in the authentication process and device 130 may send a response (e.g., a grant or denial) to the authentication server 110 for the request. In some embodiments, communication for subsequent processes includes sending a passcode to the device 130, e.g., for entry via a login screen of another device.

Consider a multi-factor authentication example in which a user sends a request from a personal computer (PC) to a previously authorized first mobile device as a factor in a multi-factor authentication process. In this example, the user utilizes the first mobile device as a second factor in the process (and the process may or may not be successful to authenticate the user). At a later time, the user may want to add a second mobile device to participate in the multi-factor authentication process. As discussed above, the user may authorize the participation of a second mobile device as a factor in the multi-factor authentication process, e.g., by capturing an image of the display of the first mobile device. Once the second mobile device has been authorized for participation in the multi-factor authentication process, the second mobile device may be used for the second factor instead of the first mobile device or may be used as a third factor in addition to the second factor.

In some embodiments, the second mobile device 130 generates additional information based on capturing the image displayed by the first mobile device 120. This information may include, for example: the time the image was taken, the number of times the capture was attempted for the code displayed on unit 122, a derivation of the secret used to generate the code, etc. In some embodiments, one or more of these exemplary types of information may be included in information 116. In some embodiments, mobile device 120 may also send parameters to server 110 for authorization of device 130. These parameters may specify, for example, a desired type of authentication participation for device 130 (e.g., passcode, biometric code, etc.), the length of time the second mobile device should be authorized to participate in the process, whether device 120 should remain authorized to participate in the multi-factor authentication process, etc. In some embodiments, the server 110 may determine whether to authorize device 130 based on the additional information from device 130 and/or may configure the authorization according to the parameters from mobile device 120.

In some embodiments, server 110 creates a secure channel with the first mobile device to transmit the secret. For example, before transmitting a secret to the first mobile device 120, authentication server 110 may encrypt the secret. In some embodiments, authentication server 110 creates a secure channel with the second mobile device 130 for communication for subsequent multi-factor authentication processes.

Exemplary Server Communication with Two Mobile Devices

Figure 2:
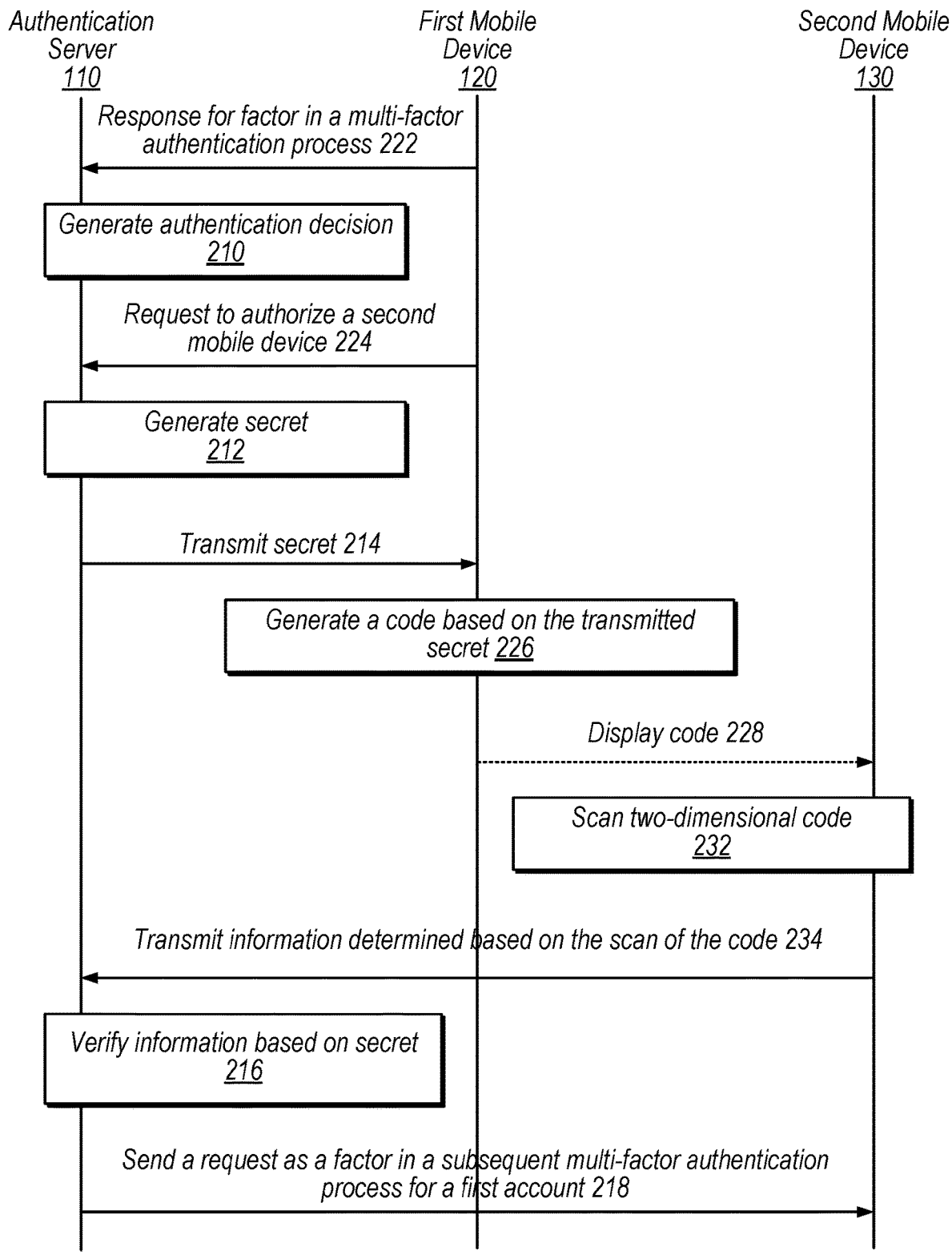
FIG. 2 shows a flow diagram of exemplary server communications with a first mobile device to facilitate authorization of a second mobile device, according to some embodiments.

FIG. 2 is a communications diagram illustrating exemplary communication between an authentication server and two mobile devices, according to some embodiments. In the illustrated embodiment, authentication server 110, first mobile device 120, and second mobile device 130 communicate to authorize device 130 for participation in a multi-factor authentication process.

At 222, in the illustrated embodiment, authentication server 110 receives a response for a factor in a multi-factor authentication process from first mobile device 120. In some embodiments, authentication server sends a permission request to first mobile device 120 after a user has logged into an account using login information (e.g., username and password). Based on receiving the response, in the illustrated embodiment, server 110 generates an authentication decision, at 210, for the multi-factor authentication process based at least in part on the response from device 120. In other embodiments, device 120 may participate as a factor in the process indirectly, e.g., by receiving a code that a user enters into a login screen of another device. Elements 222 and 210, in the illustrated example, may not be part of the authorization of second mobile device 130, but are included to show that the first mobile device 120 is already authorized to participate as a factor in the authentication process, in this example.

At 224, in the illustrated embodiment, first mobile device 120 sends a request to authorize a second mobile device 130 to server 110. The request may include one or more parameters indicating how second mobile device 130 should participate, once authorized.

At 212, in the illustrated embodiment, in response to the request from first mobile device 120, server 110 generates a secret. The secret may be stored using any of various appropriate formats. At 214, in the illustrated embodiment, server 110 transmits the generated secret to the first mobile device 120.

At 226, in the illustrated embodiment, first mobile device 120 generates a code based on the transmitted secret. At 228, in the illustrated embodiment, first mobile device 120 displays the code. Non-limiting examples of the types of codes that may be generated at 226 include: a two-dimensional code (e.g., a quick response (QR) code), a one-dimensional code (e.g., a traditional barcode), a visual pattern (e.g., an image of a known object), a passcode, a passphrase, etc. In some embodiments, the code is the secret while in other embodiments the code is derived from the secret.

At 232, in the illustrated embodiment, second mobile device 130 scans the code displayed by first mobile device 120. Various scanning devices may be used including, without limitation: barcode scanners, different types of cameras, etc. In some embodiments, the secret may be used to generate a non-image code, such as a numeric passcode which may or may not be scanned. A non-image code may allow for verbal communication of a displayed code (e.g., a passcode) by the first mobile device user to the second mobile device user, in other embodiments. Similarly, a non-image embodiment may allow for the user of the second mobile device to visually obtain the passcode from the first mobile device and manually enter the passcode into the second mobile device.

At 234, in the illustrated embodiment, second mobile device 130 transmits information determined based on the scan of the code by the second mobile device. This information may include the original secret, information specified by the code, information derived from the code, etc. At 216, in the illustrated embodiment, authentication server 110 verifies the information received from the second mobile device 130 based on the secret generated at 212. In some embodiments, the secret is a limited-use secret. For example, the secret may have a limited-use (or even single-use) such that once a device has used the secret a threshold number of times, the secret can no longer be used to authorize other devices. In some embodiments, the secret is also limited in time duration (e.g., server 110 may also verify that the transmitted information was received within a threshold time interval of generating or sending the secret). In some embodiments, if the threshold number of uses and the time interval is not exceeded, authentication server 110 is configured to authorize the second mobile device 130 for participation in a multi-factor authentication process. In some embodiments, the authentication server 110 sends a request for a non-first factor authentication to the second mobile device, after adding the second mobile device as a factor in the multi-factor authentication process. In some embodiments, if the threshold number of uses or the time interval is exceeded, authorization of the second mobile device for participation in the multi-factor authentication process is denied.

At 218, in the illustrated embodiment, authentication server 110 sends a request as a factor in a subsequent multi-factor authentication process for a first account to second mobile device 130. In some embodiments, second mobile device 130 performs one or more operations as a factor in a multi-factor authentication process for a first account, in response to receiving the request from authentication server 110. Note that the request of 218 may be sent instead of a request to the first mobile device 120 or in conjunction with the request to device 120. In other embodiments, the request at 218 may not be sent and server 110 may otherwise communicate with the second mobile device 130 as a factor in the multi-factor authentication process.

In various embodiments discussed above, a camera unit is used by the new device to capture an image of a display of an old device. This is one example of a technique to show proximity between the devices, but other techniques may be used to show proximity for authorization of the new device. For example, the proximity of the second mobile device may be determined using short-range wireless communications or signature detection, e.g., using Near-Field Communication (NFC) or Bluetooth Low Energy (BLE). In still other embodiments, proximity may be determined by reporting location data or some other method. In some embodiments, a new device is authorized to participate in multi-factor authentication without showing proximity. For example, the server 110 may send a code to the first mobile device 120 that the user may enter into the second device 130 and send to the server 110. This may not show proximity (e.g., the user may tell the code to another user over the phone) but may show ownership of device 120 or communications with an authorized user of device 120.

Exemplary User Interface

FIGS. 3A-3D depict diagrams of various exemplary UIs according to some embodiments. In the illustrated embodiment, displays 310 and 320 show an exemplary UI for the first mobile device 120 as a factor in a multi-factor authentication process for a first account. In the illustrated embodiment, displays 330 and 340 show an exemplary UI for second mobile device 130 in the multi-authentication process for the first account.

Figure 3A:
FIGS. 3A-3D depict diagrams of various exemplary user interfaces, according to some embodiments.

In FIG. 3A, display 310 of the first mobile device includes graphical element 312, which the user may select to initiate authorization of another mobile device to participate as a factor. In some embodiments, element 312 allows user of the first mobile device to send a request to a server to authorize another mobile device as a factor in the multi-factor authentication process for the first account. In some embodiments, the UI may also display a list of mobile devices that may potentially be authorized, e.g., based on their association with accounts of the user, proximity to the first mobile device 120, etc. In some embodiments, the user selects a mobile device from the list of nearby mobile devices, displayed on display 310, for authorization to participate as a factor in the multi-factor authentication process for the first account. In other embodiments, the UI may allow the user to enter other information identifying the second mobile device 130, such as its phone number.

Figure 3B:
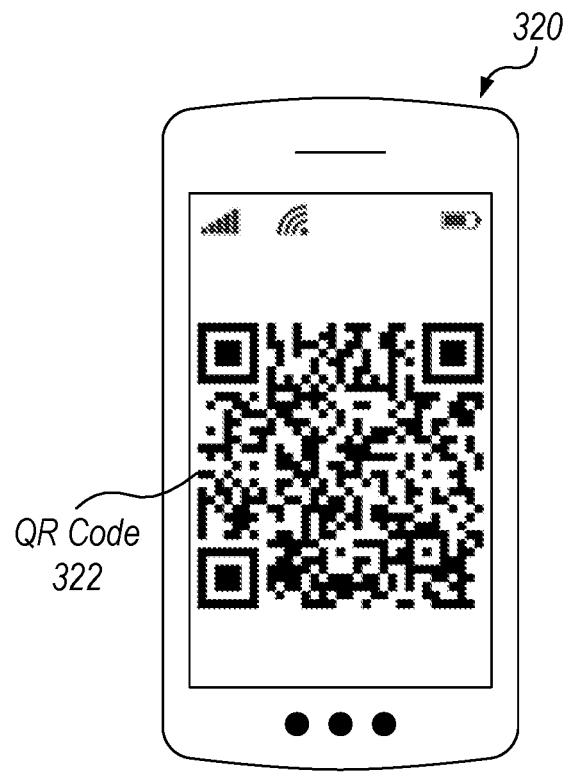

In FIG. 3B, display 320 of the first mobile device, displays an image of a QR code 322. In the illustrated example, QR code 322 encodes the phrase "This is an example QR code." In some embodiments, the QR code 322 on display 320 is generated by the authentication server and transmitted to the first mobile device, when the user of the first mobile device touches element 312 (as seen in FIG. 3A). In other embodiments, mobile device 120 generates the QR code 322 based on a secret. In some embodiments, the QR code 322 on display 320 is scanned by another mobile device (e.g., the second mobile device 130) in order to authorize the other mobile device for participation in multi-factor authentication.

Figure 3C:
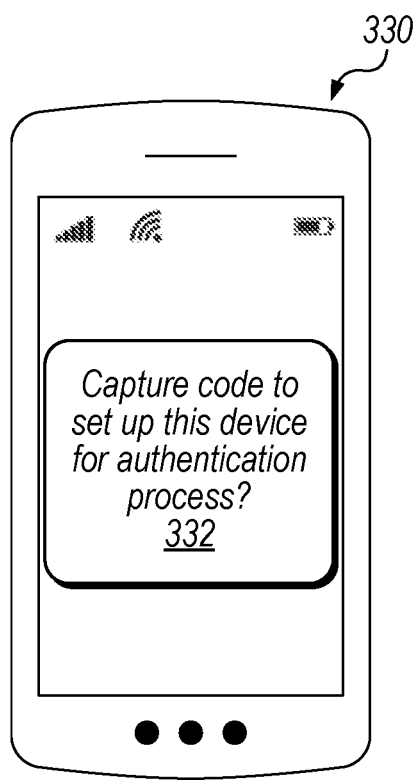

In FIG. 3C, display 330 includes element 332, which the user may select to capture a code in order to set up the second mobile device for the multi-factor authentication process. In some embodiments, when the user of the second mobile device selects element 332, the second mobile device is ready to scan the QR code 322 on display 320 of the first mobile device. In some embodiments, once the second mobile device has scanned the QR code 322 on display 320, it may communicate with the authentication server 110 in order to be authorized to participate as a factor in the multi-factor authentication process for the first account. In other embodiments, the second mobile device is authorized to participate in the multi-factor authentication process by a different technique (as described in FIG. 3D) than scanning a QR code.

Figure 3D:

In FIG. 3D display 340 includes a prompt 342, which may be displayed when device 130 participates as an authentication factor (e.g., after it has been authorized). In the illustrated embodiment, prompt 342 asks the user to enter a six-digit code "XYZ123" to authenticate login to an account "ABC." In some embodiments, similar techniques may be used to authorize device 130 initially (e.g., by displaying a similar prompt on device 120 and entering the code on device 130).

In some embodiments, various factors in a multi-factor authentication process may be automated. For example, authentication server 110 may determine to automatically verify a factor instead of contacting mobile device 120 or mobile device 130 and may determine to automatically respond to a permission request without user input, based on a current location of mobile device 130. Thus, when a device is authorized to participate as a factor in a multi-factor authentication process, it may or may not actually receive user input for the process.

As discussed above, in some examples, the user of the first mobile device may authorize a new mobile device to replace the first mobile device. In this example, the user of the first mobile device is able to authorize the new mobile device as the primary mobile device or the only mobile device. In this example, authorization of the new device is successful, replacing the first mobile device, and allowing the user to use the new mobile device instead of the first mobile device.

In another example, the user of the first mobile device may authorize a secondary mobile device to use in combination with the first mobile device. For example, the user of the first mobile device purchases a wearable mobile device (e.g., a smart watch). In this example, the new mobile device may not replace the first mobile device. Rather, both devices may be used for one or more factors, which may be dependent or independent. For example, a wearable may participate for a first factor and a mobile phone may participate for a second, independent factor. As another example, proximity between the two devices may itself be a factor in the multi-factor authentication process.

Exemplary Methods

FIG. 4 is a flow diagram illustrating an exemplary server-side method for authorizing a mobile device to participate in a multi-factor authentication process, according to some embodiments. The method shown in FIG. 4 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 410, in the illustrated embodiment, a server (e.g., server 110) generates an authentication decision for a multi-factor authentication process for a first account, wherein generating the authentication decision includes communicating with a first mobile device as a factor in the multi-factor authentication process.

At 420, in the illustrated embodiment, in response to a request to authorize participation of a second mobile device as a factor in the multi-factor authentication process for the first account, the server generates a secret and transmits the secret to the first mobile device.

At 430, in the illustrated embodiment, the server receives information from the second mobile device, wherein the information is generated based on capturing an image of a display by the first mobile device and wherein the display is based on the transmitted secret.

At 440, in the illustrated embodiment, the server verifies content of the information using the secret. In some embodiments, the second mobile device determines the secret generated by the authentication server based on the captured code. In some embodiments, the second mobile device sends the determined secret to the authentication server. In some embodiments, the authentication server verifies the secret against the original secret it created.

At 450, in the illustrated embodiment, the server verifies that the information is received within a determined time interval from transmitting the secret to the first mobile device.

At 460, in the illustrated embodiment, based on the verification of the content and the time interval, the server authorizes participation of the second mobile device as a factor in the multi-factor authentication process for the first account.

At 470, in the illustrated embodiment, based on the authorization, the server communicates with the second mobile device as a factor in a subsequent multi-factor authentication process for the first account.

In some embodiments, the secret is a limited use secret, where the verification of the information involves verifying that the secret has not been used more than a threshold number of times. In some embodiments, the display by the first mobile device uses a display unit of the first mobile device and is an image of a two-dimensional code generated based on the secret. In some embodiments, the factor is a non-first factor of the multi-factor authentication process. In some embodiments, the authentication server sends a second secret to the second mobile device in response to a request to authorize participation of a third mobile device as a factor in the multi-factor authentication process. (Said another way, once a device is authorized to participate in an authorization process, it may be used to authorize additional devices). In some embodiments, the authentication server is then configured to receive information from the third mobile device that indicates having been generated based on capturing an image of a display by the second mobile device. In some embodiments, the authentication server verifies the information based on the second secret and the determined time interval. In some embodiments, the authentication server encrypts the secret before sending it to the first mobile device.

FIG. 5 illustrates an exemplary method for facilitating authorization of another device to participate in an authentication process, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, a computing device (e.g., mobile device 120) receives a request from an authentication server as a factor in the multi-factor authentication process for the first account.

At 520, in the illustrated embodiment, the device communicates as a factor in a multi-factor authentication process for the first account.

At 530, in the illustrated embodiment, the device sends a request to the authentication server to authorize participation of a second mobile device as a factor in the multi-factor authentication process for the first account. In some embodiments, the request includes configuration information specifying the type of participation that the second mobile device may be authorized for. For example, the second mobile device may be authorized to participate as a factor in the multi-factor authentication process by manual authentication, location authentication, connectivity authentication, etc. In some embodiments, the configuration information specifies whether one or both of the mobile devices (e.g., the first mobile device and/or the second mobile device) are required to participate in the multi-factor authentication process.

At 540, in the illustrated embodiment, the device receives a secret from the authentication server.

At 550, in the illustrated embodiment, the device generates a code based on the received secret.

At 560, in the illustrated embodiment, the device displays the generated code.

FIG. 6 illustrates an exemplary method for authorization of a device, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, a computing device (e.g., device 130) captures an image of a visual pattern displayed by a mobile device to authorize participation of the computing device in a multi-factor authentication process for a first account, wherein the mobile device is previously authorized to participate as a factor in the multi-factor authentication process and wherein the visual pattern is based on a secret transmitted to the mobile device from an authentication server.

At 620, in the illustrated embodiment, the device processes the captured image and sends information to the authentication server based on the captured image as evidence of physical proximity to the mobile device.

At 630, in the illustrated embodiment, based on verification by the authentication server of the information, the device receives a request as a factor in a subsequent multi-factor authentication process for the first account.

In some embodiments, the device processes the captured image by determining the secret based on the visual pattern. In some embodiments, after determining the secret, the device sends information, including the determined secret, to the authentication server. In some embodiments, the device receives a non-first factor request from the authentication server for the multi-factor authentication process for the first account.

Exemplary Computing Device

Turning now to FIG. 7, a block diagram of a computing device (which may also be referred to as a computing system) 710 is depicted, according to some embodiments. Computing device 710 may be used to implement various portions of this disclosure. Computing device 710 is one example of a device that may be used as a mobile device, a server computer system, a client computer system, or any other computing system implementing portions of this disclosure.

Computing device 710 may be any suitable type of device, including, but not limited to, a personal computer system, desktop computer, laptop or notebook computer, mobile phone, mainframe computer system, web server, workstation, or network computer. As shown, computing device 710 includes processing unit 750, storage subsystem 712, and input/output (I/O) interface 730 coupled via interconnect 760 (e.g., a system bus). I/O interface 730 may be coupled to one or more I/O devices 740. Computing device 710 further includes network interface 732, which may be coupled to network 720 for communications with, for example, other computing devices.

Processing unit 750 includes one or more processors, and in some embodiments, includes one or more coprocessor units. In some embodiments, multiple instances of processing unit 750 may be coupled to interconnect 760. Processing unit 750 (or each processor within processing unit 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory in some embodiments. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In some embodiments, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 7 is one embodiment for demonstrating disclosed concepts. In other embodiments, various aspects of the computing device may be different. For example, in some embodiments, additional components, or multiple instances of the illustrated components may be included.

This specification includes references to "one embodiment," "other embodiments," "some embodiments," or "an embodiment." The appearances of these phrases do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    generating, by a computing system, an authentication decision for a multi-factor authentication process for a first account, wherein generating the authentication decision includes communicating with a first mobile device as a factor in the multi-factor authentication process;
    in response to a request to authorize participation of a second mobile device as a factor in the multi-factor authentication process for the first account, the computing system generating a secret and transmitting the secret to the first mobile device;
    receiving, by the computing system, information from the second mobile device, wherein the information is generated based on capturing an image of a display by the first mobile device, wherein the display is based on the transmitted secret;
    verifying, by the computing system, content of the information using the secret;
    verifying, by the computing system, that the information is received within a determined time interval from transmitting the secret to the first mobile device;
    based on the verification of the content and the time interval, authorizing participation of the second mobile device as a factor in the multi-factor authentication process for the first account; and
    based on the authorizing, communicating with the second mobile device as a factor in a subsequent multi-factor authentication process for the first account.

2. The method of claim 1, further comprising:
    verifying that the secret has not been used more than a threshold number of times, wherein the secret is a limited-use secret.

3. The method of claim 1, further comprising:
    receiving, from the first mobile device, configuration information that indicates one or more parameters for use of the second mobile device in the multi-factor authentication process.

4. The method of claim 3, wherein the configuration information specifies whether both of the first and the second mobile devices are to participate in the multi-factor authentication process.

5. The method of claim 3, wherein the configuration information specifies a type of authentication to request from the second mobile device for the subsequent multi-factor authentication process.

6. The method of claim 1, wherein the display is an image of a two-dimensional pattern generated based on the secret.

7. The method of claim 1, wherein the authentication factor is a non-first factor of the multi-factor authentication process.

8. A non-transitory computer readable medium having instructions stored thereon that are capable of being executed by a computer system to perform operations comprising:
    generating an authentication decision for a multi-factor authentication process for a first account, wherein generating the authentication decision includes communicating with a first mobile device as a factor in the multi-factor authentication process;
    in response to a request to authorize participation of a second mobile device as a factor in the multi-factor authentication process for the first account, generating a secret and transmitting the secret to the first mobile device;
    receiving information from the second mobile device, wherein the information is indicated as pertaining to the request to authorize participation of the second mobile device and is generated based on capturing an image of a display by the first mobile device, wherein the display is based on the transmitted secret;
    verifying content of the information using the secret;
    verifying that the information is received within a determined time interval from transmitting the secret to the first mobile device;
    based on the verification of the content and the time interval, authorizing participation of the second mobile device as a factor in the multi-factor authentication process for the first account; and based on the authorizing, communicating with the second mobile device as a factor in a subsequent multi-factor authentication process for the first account.

9. The non-transitory computer readable medium of claim 8, wherein the secret is a limited-use secret, wherein the operations further comprise verifying that the secret has not been used more than a threshold number of times.

10. The non-transitory computer readable medium of claim 8, wherein the operations further comprise:
receiving, from the first mobile device, configuration information that indicates one or more parameters for use of the second mobile device in the multi-factor authentication process.

11. The non-transitory computer readable medium of claim 10, wherein the configuration information specifies whether both of the first and the second mobile devices are to participate in the multi-factor authentication process.

12. The non-transitory computer readable medium of claim 10, wherein the configuration information specifies a type of authentication to request from the second mobile device for subsequent multi-factor authentication process.

13. The non-transitory computer readable medium of claim 8, wherein the display uses a display unit of the first mobile device and is an image of a two-dimensional code generated based on the secret.

14. The non-transitory computer readable medium of claim 8, wherein the authentication factor is a non-first factor of the multi-factor authentication process.

15. The non-transitory computer readable medium of claim 8, wherein the operations further comprise:
in response to a request to authorize participation of a third mobile device as a factor in the multi-factor authentication process, transmitting a second secret to the second mobile device;
receiving information from the third mobile device, wherein the information is indicated as having been generated based on capturing an image of a display by the second mobile device; and
verifying the information based on the second secret and the determined time interval.

16. The non-transitory computer readable medium of claim 8, wherein the secret is encrypted before it is sent to the first mobile device.

17. A non-transitory computer readable medium having instructions stored thereon that are capable of being executed by a computing device to:
capture an image of a visual pattern displayed by a mobile device to authorize participation of the computing device as a factor in a multi-factor authentication process for a first account, wherein the mobile device is previously authorized to participate as a factor in the multi-factor authentication process and wherein the visual pattern is based on a secret transmitted to the mobile device from an authentication server;
process the captured image and send information to the authentication server based on the captured image as evidence of physical proximity to the mobile device; and
based on verification by the authentication server of the information, receive a request as a factor in a subsequent multi-factor authentication process for the first account.

18. The non-transitory computer readable medium of claim 17, wherein the instructions are further executable to:
request authorization for participation of another mobile device in the multi-factor authentication process for the first account; and
display a visual pattern based on a secret received from the authentication server in response to the request.

19. The non-transitory computer readable medium of claim 17, wherein processing the captured image includes determining the secret based on the visual pattern, wherein the information includes the secret.

20. The non-transitory computer readable medium of claim 17, wherein the received request is a non-first factor in the multi-factor authentication process for the first account.

* * * * *